March 12, 1957 M. P. PEUCKER 2,784,593

DOUBLE DIAPHRAGM ELECTRICAL PRESSURE GAGE

Filed May 12, 1952

*INVENTOR*
MAX PAUL PEUCKER

BY

*ATTORNEYS*

United States Patent Office 2,784,593
Patented Mar. 12, 1957

2,784,593

DOUBLE DIAPHRAGM ELECTRICAL PRESSURE GAGE

Max P. Peucker, Washington, D. C., assignor to the United States of America as represented by the Secretary of the Navy Application May 12, 1952, Serial No. 287,411

5 Claims. (Cl. 73—398)

(Granted under Title 35, U. S. Code (1952), sec. 266)

The invention described herein may be manufactured and used by or for the Government of the United States of America for governmental purposes without the payment of any royalties thereon or therefor.

This invention relates to a pressure gage for instantaneously measuring static and dynamic pressures on aerodynamic bodies in wind tunnels and also in free-flight investigations on missiles and airplanes.

Heretofore, in conducting experiments on models in wind tunnels it has been the practice to provide small holes in the surface of the model at the points of desired pressure determination. Long tubes of small diameter connected these holes with manometers or vacuum meters located outside the wind tunnel. After the blow within the wind tunnel commenced, a considerable period of time was required to equalize the pressure in the system due to the relatively large volume of the pressure measuring system and due to the flow resistance of the long small tubes. In supersonic wind tunnels where the length of blow is limited to a short period of time, as, for example, 40 seconds, such time delay is highly undesirable.

The invention herein disclosed overcomes this objectionable characteristic by providing pressure gages of a type which can be mounted internally of the model thereby eliminating the long tubes of prior art devices and accordingly permitting instantaneous pressure measurements. This is accomplished, in one embodiment herein disclosed, by means of a cylindrical ring having diaphragms mounted on each end. Strain responsive means, specifically consisting of bonded wire strain gages of the spiral type are suitably secured to the inner and outer surfaces of each diaphragm. The ring is provided with a central aperture which is connected by means of a short tube with an aperture in the shell of the model to be tested. The strain gages are connected in a Wheatstone bridge provided with a suitable electrical source and recorder. The interior of the model is evacuated so that a known reference pressure is applied to the outer surfaces of the diaphragms. When the blow is begun, pressure variations are instantaneously transmitted to the inner surfaces of the diaphragms whereby the strain gages are distorted and a record of the pressure is obtained.

An object of this invention is to provide a means for instantaneously and accurately measuring the static and dynamic pressures on aerodynamic bodies in wind tunnels.

A further object of this invention is to provide a means for measuring the pressure developed at selected points on aerodynamic bodies and for immediately transforming such pressures into electrical signals.

Another object of this invention is the provision of a pressure measuring means in which strain gages are connected in such a manner as to provide for temperature compensation and to insure a high degree of accuracy.

Still another object of this invention is to provide a pressure gage embodying strain gages suitably secured to opposite sides of two diaphragms in which the inner surface is subjected to the test pressure and the outer surface to a reference pressure whereby small pressure variations may be accurately determined.

Other objetcs and many of the attendant advantages of this invention will be readily appreciated as the same becomes better understood by reference to the following detailed description when considered in connection with the accompanying drawings wherein.

Figure 1:
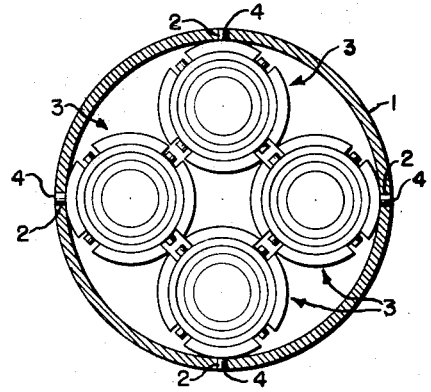
Fig. 1 is a cross sectional view of an aerodynamic model showing the relative positions of the pressure gages.

Referring now to the drawings wherein like numerals indicate like parts throughout the several views, there is shown in Fig. 1 in cross section a model 1 which is adapted to be disposed within a wind tunnel. It is desired to determine the static and dynamic pressures at a plurality of points on this model and for this purpose apertures 2 are provided. Pressure gages 3 have small short tubes 4 secured thereto which are fitted within apertures 2. It can be seen that by this construction the desired pressure is measured without employing long tubes which offer flow resistance and reduce the accuracy of the pressure measurement.

Figure 2:
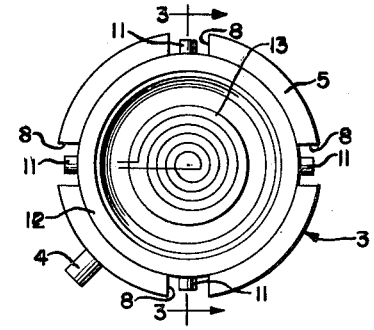
Fig. 2 is an elevational view of one form of a pressure gage.
Figure 4:
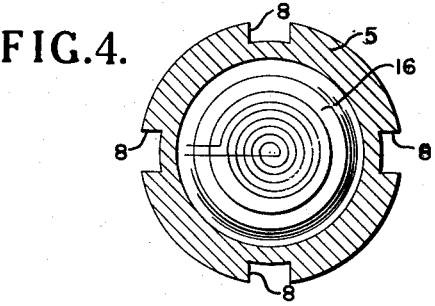
Fig. 4 is a sectional view along the line 4—4 of Fig. 3.
Figure 3:
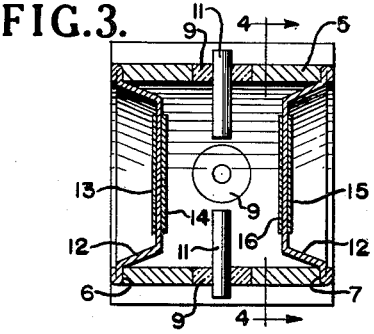
Fig. 3 is a sectional view along the line 3—3 of Fig. 2.
Figure 5:
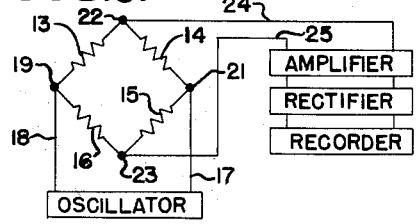
Fig. 5 is a view showing the manner of connecting the pressure indicator in an electrical bridge circuit.

One embodiment of the present invention is disclosed in Figs. 2 to 4 wherein there is shown a ring member 5 made of copper or other suitable material and which is provided with recessed portions 6 and 7. Ring member 5 is further provided with four circumferentially spaced grooves 8 and apertures through the ring member which are closed by means of glass seals 9 with Kovar conductor elements 11 extending therethrough. Each open end of the ring member is provided with a beryllium copper diaphragm 12 which is press fitted within recessed portions 6 and 7. Spiral strain gages 13 to 16 of a well known variety are secured in any suitable manner to both sides of diaphragms 12 as shown in Fig. 3. The internal strain gages 14 and 16 are connected to conductors 11 and the gages are connected externally in a bridge circuit in the manner clearly shown in Fig. 5. The oscillator output is transmitted through conductors 17 and 18 to points 19 and 21 of the bridge and the points 22 and 23 of the bridge are connected by conductors 24 and 25 to the amplifier.

It can be seen that, when the pressure gage is installed in the manner shown in Fig. 1 the diaphragms will respond to a pressure differential where the test pressure is applied through tube 4 on the inner surfaces of diaphragms 12 and a reference pressure acts against the outer surfaces of the diaphragms. This pressure is immediately transformed into an electrical signal by the strain gages and is recorded by any conventional means. It is apparent that resistance changes due to temperature variation are effectively cancelled by the arrangement of the strain gages in the bridge circuit.

Figure 6:
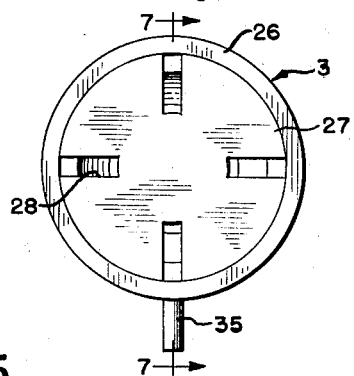
Fig. 6 is an elevational view of another form of the present invention.
Figure 7:
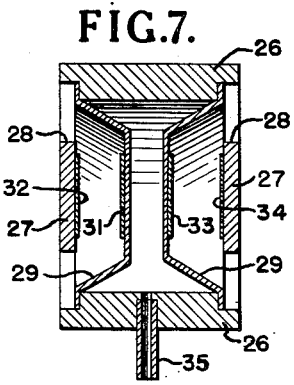
Fig. 7 is a section view along the line 7—7 of Fig. 6.

In Figs. 6 and 7 there is shown a modification of the presently disclosed pressure gage. In this embodiment a ring 26 similar to ring 5 is provided with metallic end plates in the form of discs 27 having cut-out portions 28. Diaphragms 29 are secured to ring 26 beneath discs 27 and strain gages 31 to 34 are suitably secured to the diaphragms and discs in the manner shown. The leads from the strain gages may be brought out through cut-out portions 28 thereby eliminating the necessity for the seals 9 and conductors 11 employed in the form shown in Figs. 2 and 3. With reference to the circuit diagram of Fig. 5 strain gages 31 to 34 are connected in the same manner as strain gages 13 to 16 respectively. Gages 32 and 34 provide for temperature compensation and are not responsive to pressure variations. In this embodiment the reference pressure is applied to the outer surfaces of the diaphragms through the cut-out portions 28 and the test pressure is admitted through tube 35.

It is apparent that there has been provided by the presently disclosed invention a means for accurately and instantaneously measuring the static and dynamic pressures on aerodynamic bodies. Various alterations in the structure are possible to adapt the pressure gage for measurements at points on the model where the use of the tube is not practical. For example, the volume within the ring member could be evacuated and sealed off to provide a fixed reference pressure and the test pressure applied to the outer surfaces of the diaphragms. Such a construction is particularly well adapted for pressure measurements at the base of a model where a large open area is presented.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent is:

1. A pressure gage comprising, a metallic member in the form of a hollow open ended cylinder having an aperture in the sidewall thereof, diaphragms having at least a portion thereof of planar contour, one of said diaphragms secured within and sealing each open end of said member to define an enclosed chamber therewithin adaptable to have an unknown pressure admitted therein through said aperture, strain gages carried by the inner and outer planar surfaces of said diaphragms, and means including a bridge circuit for measuring movement of said diaphragms from a normal position whereby said unknown pressure admitted through said aperture may be determined.

2. In a bridge circuit pressure gage for measuring the pressure of a fluid, a ring-shaped member provided with an aperture therein and a pair of opposed open ends, a pair of metallic diaphragms having predetermined similar planar surfaces, each of said diaphragms being secured within a respective one of said open ends to define an enclosed chamber therewithin adaptable to receive a fluid communicated thereto through said aperture whereby said diaphragms are flexed proportional to the pressure of said fluid, strain gages secured to the inner and outer planar surfaces of said diaphragms, and means including said strain gages for measuring the flexure of said diaphragms caused by the pressure of said fluid.

3. In a pressure gage for measuring the unknown pressure of a fluid, a pressure sensitive measuring device comprising a pair of diaphragms each having a similarly configured pressure sensitive planar portion, a cylindrical housing having open ends into which said diaphragms are fitted to enclose a test volume between the adjacent surfaces of said diaphragms, means forming an orifice in the sidewall of said housing for providing communication with the interior thereof whereby a fluid may be supplied to said test volume to exert an unknown pressure on the planar portions of said diaphragms to cause movement thereof proportional to the unknown pressure, a first pair of spirally wound strain gears secured one on each face of the planar portion of one of said diaphragms whereby the resistance of said first pair of strain gages is varied an amount proportional to the movement of the planar portion of said one diaphragm, a second pair of spirally wound strain gages secured one on each face of the planar portion of the other of said diaphragms whereby the resistance of said second pair of strain gages is varied an amount proportional to the movement of the planar portion of said other diaphragm, said first and second pairs of strain gages being connected to form a Wheatstone bridge, the resistance variations of said strain gages causing an unbalance of said bridge which is a measure of the unknown pressure, and means for measuring the unbalance of said bridge and indicating the value of said unknown pressure.

4. A pressure gage according to claim 3 wherein the open ends of said housing have an annular recess and said diaphragms being of frusto-conical configuration with a circumferentially curled lip, said lip being conformingly and frictionally retained within said annular recess.

5. In a pressure gage for measuring the unknown pressure of a fluid and indicating the value of the measured pressure on electrical indicating means, a pressure sensitive device comprising enclosed test volume defining means including parallel spaced axially aligned resilient members and a communicating aperture for permitting the application of pressure producing fluid to the enclosed test volume to thereby exert an unknown pressure on said resilient members whereby said resilient members are flexed an amount proportional to the unknown pressure produced by the applied fluid, each of said members having a planar face exposed to the test volume and an opposing planar face externally of the test volume, a first pair of spirally wound electrical resistance type strain gages secured one on each planar face of one of said resilient members whereby the resistance of said first pair of gages is varied an amount proportional to the flexure of said one resilient member, a second pair of spirally wound electrical resistance type strain gages secured one on each planar face of the other of said resilient members whereby the resistance of said second pair of gages is varied an amount proportional to the flexure of said other resilient member, said first and second pairs of gages being connected to form a Wheatstone bridge, the resistance variations of said gages causing an unbalance in potential across said bridge which is a measure of the unknown pressure, and circuit means for applying said potential unbalance to said electrical indicating means.

References Cited in the file of this patent

UNITED STATES PATENTS

| | | |
|---|---|---|
| 2,398,401 | Bancroft et al. | Apr. 16, 1946 |
| 2,400,467 | Ruge | May 14, 1946 |
| 2,420,148 | Ostergren | May 6, 1947 |
| 2,472,045 | Gibbons | May 31, 1949 |
| 2,477,507 | Africano | July 26, 1949 |
| 2,535,998 | Bierman | Dec. 26, 1950 |
| 2,580,407 | Clark | Jan. 1, 1952 |
| 2,626,337 | Mitchell | Jan. 20, 1953 |
| 2,641,131 | Waugh | June 9, 1953 |

OTHER REFERENCES

Publication—"Mesures et Controle Industriel," vol. 14, No. 143, April 1949, page 143.